United States Patent
Miyagawa

(10) Patent No.: US 9,857,213 B2
(45) Date of Patent: Jan. 2, 2018

(54) LIQUID-LEVEL DETECTION DEVICE

(71) Applicant: DENSO CORPORATION, Kariya, Aichi-pref. (JP)

(72) Inventor: Isao Miyagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 49 days.

(21) Appl. No.: 14/898,981

(22) PCT Filed: Jun. 16, 2014

(86) PCT No.: PCT/JP2014/003178
§ 371 (c)(1),
(2) Date: Dec. 16, 2015

(87) PCT Pub. No.: WO2014/203512
PCT Pub. Date: Dec. 24, 2014

(65) Prior Publication Data
US 2016/0131515 A1     May 12, 2016

(30) Foreign Application Priority Data

Jun. 20, 2013  (JP) .................................. 2013-129683

(51) Int. Cl.
*G01F 23/38* (2006.01)
(52) U.S. Cl.
CPC .................................. *G01F 23/38* (2013.01)
(58) Field of Classification Search
CPC .......................................................... G01F 23/38
See application file for complete search history.

(56) References Cited

U.S. PATENT DOCUMENTS

2011/0036165 A1   2/2011   Fukuhara

FOREIGN PATENT DOCUMENTS

| JP | H11237275 A | 8/1999 |
|---|---|---|
| JP | 2002206947 A | 7/2002 |

(Continued)

OTHER PUBLICATIONS

International Search Report and Written Opinion (in Japanese with English Translation) for PCT/JP2014/003178, dated Sep. 16, 2014; ISA/JP.

*Primary Examiner* — Paul West
(74) *Attorney, Agent, or Firm* — Harness, Dickey & Pierce, P.L.C.

(57) ABSTRACT

A liquid-level detection device for detecting a level of a liquid surface of liquid stored in a container, includes a rotatable body that rotates in accordance with the liquid surface, a fixation body having a main body part fixed to the container and a supporting part projecting from the main body part in an axial direction along a rotation axis of the rotatable body to rotatably support the rotatable body, a pair of magnet parts held by the rotatable body at arrangement positions with the rotation axis therebetween to generate a magnetic flux passing through the supporting part, and a detecting part having an element part disposed inside the supporting part to output a detection result according to a density of a magnetic flux passing through the element part. The rotatable body includes an exposed surface that is located outward of the supporting part and the pair of magnet parts in the axial direction and that is exposed into the container. An erected wall rising up from the exposed surface outward in the axial direction is provided between two projection regions which are obtained by projecting the pair of magnet parts onto the exposed surface outward in the axial direction.

4 Claims, 4 Drawing Sheets

(56) References Cited

FOREIGN PATENT DOCUMENTS

| | | | |
|---|---|---|---|
| JP | 2004333283 | A | 11/2004 |
| JP | 2006153679 | A | 6/2006 |
| JP | 2006313124 | A | 11/2006 |
| JP | 2009257911 | A | 11/2009 |
| JP | 2012098210 | A | 5/2012 |
| JP | 2012181106 | A | 9/2012 |

LIQUID-LEVEL DETECTION DEVICE

CROSS REFERENCE TO RELATED APPLICATIONS

This application is a U.S. National Phase Application under 35 U.S.C. 371 of International Application No. PCT/JP2014/003178 filed on Jun. 16, 2014 and published in Japanese as WO 2014/203512 A1 on Dec. 24, 2014. This application is based on and claims the benefit of priority from Japanese Patent Application No. 2013-129683 filed on Jun. 20, 2013. The entire disclosures of all of the above applications are incorporated herein by reference.

TECHNICAL FIELD

The present disclosure relates to a liquid-level detection device that detects a liquid surface level of liquid stored in a container.

BACKGROUND ART

There is conventionally known a liquid-level detection device that detects a level of the liquid surface by measurement of a rotation angle of a rotatable body that rotates in accordance with a liquid surface of liquid. As a kind of such a liquid-level detection device, a configuration disclosed in, for example, Patent Document 1 includes a magnet holder that holds a pair of magnets, and a housing that rotatably supports the magnet holder by a supporting shaft in which a Hall IC is embedded.

In the above-described configuration, the density of magnetic flux passing through the Hall IC changes according to the rotation of the magnet holder that holds the pair of magnets. Accordingly, by measurement of a rotation angle of the magnet holder based on the output from the Hall IC, the liquid-level detection device can detect a level of a surface of liquid stored in a container.

PRIOR ART DOCUMENT

Patent Document

Patent Document 1: JP 2012-181106A

The magnet holder in Patent Document 1 includes an exposed surface which is located in a projecting direction of the supporting shaft relative to the supporting shaft and each magnet and exposed into the container. In a case of long-term use of the liquid-level detection device in such a mode, the inventor has considered an issue that a foreign substance having magnetic properties (hereinafter referred to as a "magnetic foreign substance") which is mixed into the liquid is attached on the exposed surface to cause deterioration in detection accuracy.

To give a detailed explanation, the magnetic force of each magnet is easily applied to a flat exposed surface of the magnet holder, so that the magnetic foreign substance is gradually attached. As a result of the continuation of this attachment of the magnetic foreign substance, a magnetic circuit connecting together these projection regions is formed by the magnetic foreign substance between two projection regions obtained by projecting the magnets onto the exposed surface. Due to the leakage of magnetic flux to this magnetic circuit, the magnetic flux passing through the supporting shaft and the Hall IC is weakened to cause a secular change of a detection result of the Hall IC.

SUMMARY OF INVENTION

The present disclosure addresses the above issues. Thus, it is an objective of the present disclosure to provide a liquid-level detection device that can continue to output a highly accurate detection result for a long period of use.

To achieve the objective of the present disclosure, a liquid-level detection device for detecting a level of a liquid surface of liquid stored in a container in an aspect of the present disclosure includes a rotatable body that rotates in accordance with the liquid surface, a fixation body that includes a main body part fixed to the container and a supporting part projecting from the main body part in an axial direction along a rotation axis of the rotatable body to rotatably support the rotatable body, a pair of magnet parts that are held by the rotatable body at arrangement positions with the rotation axis therebetween to generate a magnetic flux passing through the supporting part, and a detecting part that includes an element part disposed inside the supporting part to output a detection result according to a density of a magnetic flux passing through the element part. The rotatable body includes an exposed surface that is located outward of the supporting part and the pair of magnet parts in the axial direction and that is exposed into the container. An erected wall rising up from the exposed surface outward in the axial direction is provided between two projection regions which are obtained by projecting the pair of magnet parts onto the exposed surface outward in the axial direction.

In this aspect, the erected wall rising up from the exposed surface in the projecting direction is provided on the exposed surface located in the projecting direction of the supporting part and the pair of magnets. The surface of the erected wall is positioned partly away from the magnets, and thus magnetic force is not easily applied to this surface. Accordingly, a magnetic foreign substance contained in the liquid is not easily attached on the surface of the erected wall. As a result, there can be avoided a situation in which the magnetic flux passing through the supporting part is weakened due to the formation of a magnetic circuit by the magnetic foreign substance between the two projection regions obtained by projecting the magnets onto the exposed surface. Thus, the liquid-level detection device can continue to output a highly accurate detection result for a long period of use.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
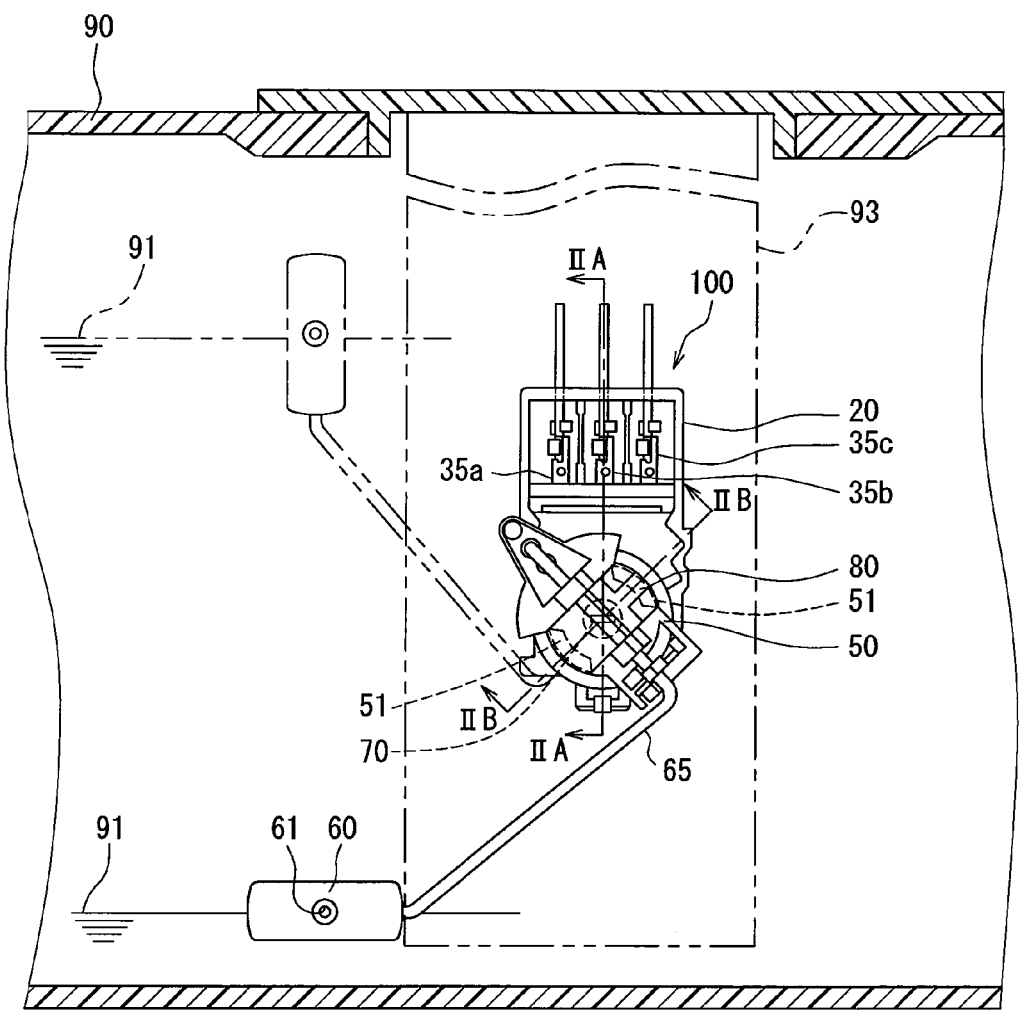
FIG. 1 is a front view illustrating a liquid-level detection device in accordance with a first embodiment.

Embodiments will be described below in reference to the drawings. Using the same reference numeral for corresponding components throughout the embodiments, a repeated description may be omitted. In a case of description of only a part of configuration in each embodiment, a configuration in another embodiment explained ahead of the embodiment can be applied to the other part of the configuration. In addition to a combination of the configurations indicated in the descriptions of the embodiments, the configurations in the embodiments can be partially combined together even without explanation thereof as long as this combination functions.

First Embodiment

As illustrated in FIG. 1, a liquid-level detection device 100 of a first embodiment is disposed in a fuel tank 90 that stores fuel as a liquid. The liquid-level detection device 100 detects a level of a liquid surface 91 of fuel stored in the fuel tank 90 with the device 100 held by a fuel pump module 93 or the like. The liquid-level detection device 100 includes a housing 20, a float 60, a magnet holder 50, and a Hall IC 70.

Figure 2:
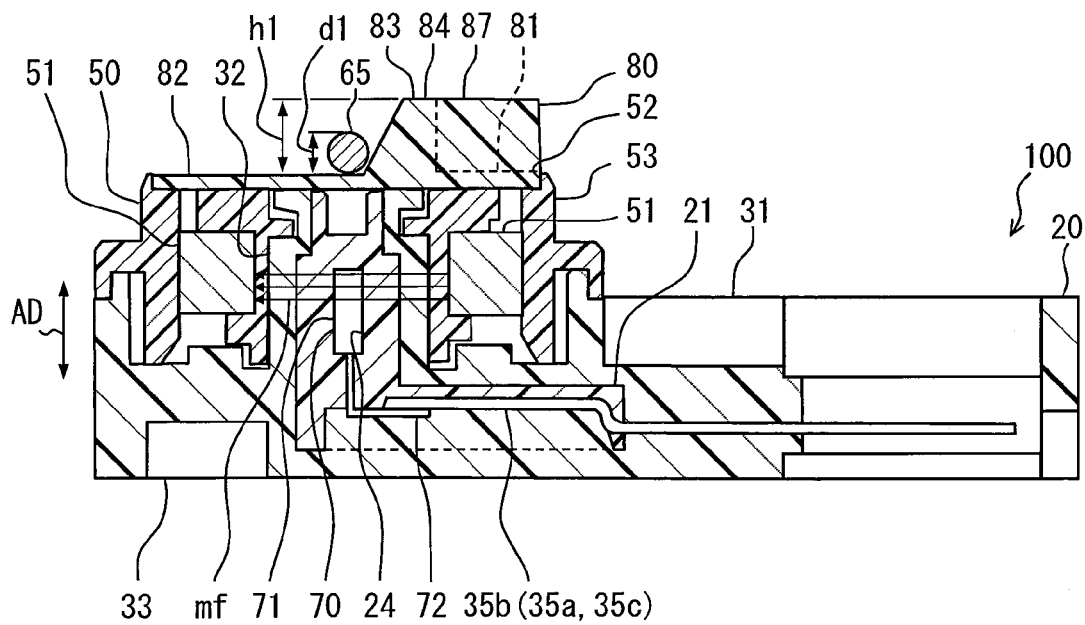
FIG. 2 is a diagram of a combination of a sectional view illustrating a housing taken along a line IIA-IIA in FIG. 1 and a sectional view illustrating a magnet holder taken along a line IIB-IIB in FIG. 1.

The housing 20 illustrated in FIG. 2 includes an inner case 21, terminals 35a to 35c, and an outer case 31. The inner case 21 is formed from a resin material such as polyphenylene sulfide (PPS) resin. An element accommodating chamber 24 that accommodates the Hall IC 70 is provided for the inner case 21. The three terminals 35a to 35c (see also FIG. 1) are formed in a band plate shape from a conductive material such as phosphor bronze. The terminals 35a to 35c are used for transmission of a detection signal such as voltage between an external device (e.g., combination meter) and the Hall IC 70. The outer case 31 is formed from a resin material such as PPS resin. The outer case 31 is formed to cover the outside of the inner case 21 so as to accommodate the inner case 21. The outer case 31 includes a shaft part 32. The shaft part 32 projects cylindrically from a main body part 33 that is fixed to the fuel tank 90 (see FIG. 1) via the fuel pump module 93 (see FIG. 1). The shaft part 32 is fitted in the magnet holder 50 to rotatably support this magnet holder 50.

The float 60 illustrated in FIG. 1 is formed from a material with lower specific gravity than fuel, such as foamed ebonite. The float 60 can float on the liquid surface 91 of fuel. The float 60 is supported by the magnet holder 50 via a float arm 65. The float arm 65 is formed in a round bar shape from a magnetic material such as stainless steel, and is inserted through a through hole 61, which is formed at the float 60.

The magnet holder 50 illustrated in FIGS. 1 and 2 is formed in a disc shape from a resin material or the like. The magnet holder 50 includes the main body part 53 and a holder cover 80. The magnet holder 50 holds the float arm 65 and is fitted outside the shaft part 32 to be supported rotatably relative to the housing 20. As a result of the above-described configuration, the magnet holder 50 rotates relative to the housing 20 integrally with a magnet 51 in accordance with the liquid surface 91. A pair of magnets 51 are accommodated in this magnet holder 50. The pair of magnets 51 are held at arrangement positions with a rotation shaft of the holder 50 therebetween to be opposed to each other with the shaft part 32 therebetween. Accordingly, the pair of magnets 51 produce magnetic flux mf passing through the Hall IC 70 accommodated in the element accommodating chamber 24.

The Hall IC 70 illustrated in FIG. 2 is a detection element that detects a relative angle of the magnet holder 50 relative to the housing 20. The Hall IC 70 includes an element part 71 and three lead wires 72. The element part 71 is formed in a flat plate shape, and is accommodated in the element accommodating chamber 24, which is provided in the shaft part 32, to be located between the pair of magnets 51. The lead wires 72 extend out of the element part 71 and are connected to the terminals 35a to 35c, respectively. The Hall IC 70 has its element part 71 acted upon by the magnetic field from the magnets 51 in a voltage application state so as to generate a voltage in accordance with (proportional to) the density of the magnetic flux mf passing through the Hall IC 70. The voltage generated in the Hall IC 70 is measured by the external device as a signal indicating the detection result through the lead wires 72, the terminals 35a to 35c and so forth.

In the above-described liquid-level detection device 100 illustrated in FIG. 1, the reciprocating operation of the float 60 moving vertically in accordance with the fuel is converted into a rotational movement through the float arm 65 which is held by the magnet holder 50, and is transmitted to these integrated components 50, 65. For this reason, the magnet holder 50 rotates relative to the housing 20 in accordance with the liquid surface of fuel accumulated in the fuel tank 90. The magnetic flux density of the magnetic field applied to the Hall IC 70 changes due to this relative rotation of the magnet holder 50. Accordingly, the voltage outputted from the Hall IC 70 changes. In this manner, the liquid-level detection device 100 realizes the detection of the rotation angle of the magnet holder 50, eventually, the surface level of fuel.

Details of the holder cover 80 of the magnet holder 50 will be further described with reference to FIGS. 2 to 4.

Figure 3:
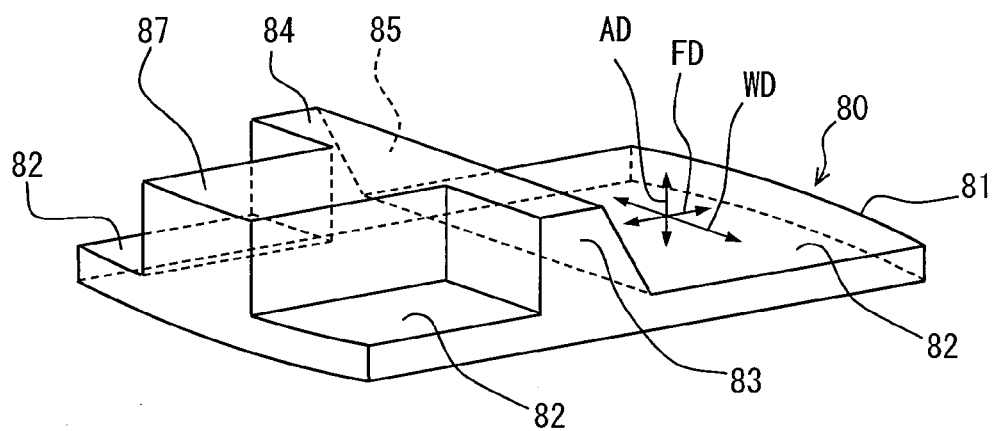
FIG. 3 is a perspective view illustrating a configuration of a holder cover according to the first embodiment.

As illustrated in FIGS. 2 and 3, the holder cover 80 includes a main body plate part 81, an erected wall 83, and an auxiliary wall 87. The main body plate part 81 is formed in a plate shape, and is fitted in an opening 52 of the main body part 53 from the outside in an axial direction AD which is a projecting direction of the shaft part 32. The main body plate part 81 is fixed to the main body part 53 by heat calking or the like. The main body plate part 81 is located outward of the shaft part 32 and the magnets 51 in the axial direction AD. An outer surface of this main body plate part 81 that is exposed into the fuel tank 90 (see FIG. 1) is an exposed surface 82. In the following description, the two regions obtained by projecting the magnets 51 onto the exposed surface 82 outward in the axial direction AD are referred to as projection regions 56, 57 illustrated in FIG. 4. The middle portion of one projection region 56 of the first embodiment is omitted because the exposed surface 82 is divided by the auxiliary wall 87. As illustrated in FIGS. 2 and 4, the region obtained by projecting the shaft part 32 onto the exposed surface 82 outward in the axial direction AD is referred to as a central region 58. The direction in which the two magnets 51 are opposed to each other and in which the two projection regions 56, 57 are arranged side by side with the central region 58 therebetween is referred to as an opposing direction FD. The direction that is substantively perpendicular to the opposing direction FD along the exposed surface 82 is referred to as a width direction WD.

As illustrated in FIG. 2, the erected wall 83 stands from the exposed surface 82 outward in the axial direction AD to the level above the float arm 65 which is disposed to cross over the exposed surface 82. For this reason, a height size h1 from the exposed surface 82 to a top surface 84 of the erected wall 83 along the axial direction AD is larger than a diameter d1 of a cross section of the float arm 65. As illustrated in FIGS. 3 and 4, the erected wall 83 extends in the width direction WD along the exposed surface 82. Both end portions of the erected wall 83 in the extending direction reach both edges of the exposed surface 82 in the width direction WD. Accordingly, the length of the erected wall 83 (hereinafter referred to as a "width size w1") in the width direction WD is substantively the same as the maximum lengths of the projection regions 56, 57 in the width direction WD (hereinafter referred to as "maximum width sizes w2, w3"). To avoid its interference with the float arm 65, the erected wall 83 is provided at a position slightly closer to the projection region 56 from an intermediate position between the two projection regions 56, 57. As a result of such arrangement, at least a part of the erected wall 83 is located in the central region 58. The side wall of the erected wall 83 adjacent to the float arm 65 is an inclined surface 85. As illustrated in FIGS. 2 to 4, in a direction away from the exposed surface 82 along the axial direction AD, the inclined surface 85 is inclined in a direction away from the projection region 57.

Figure 4:
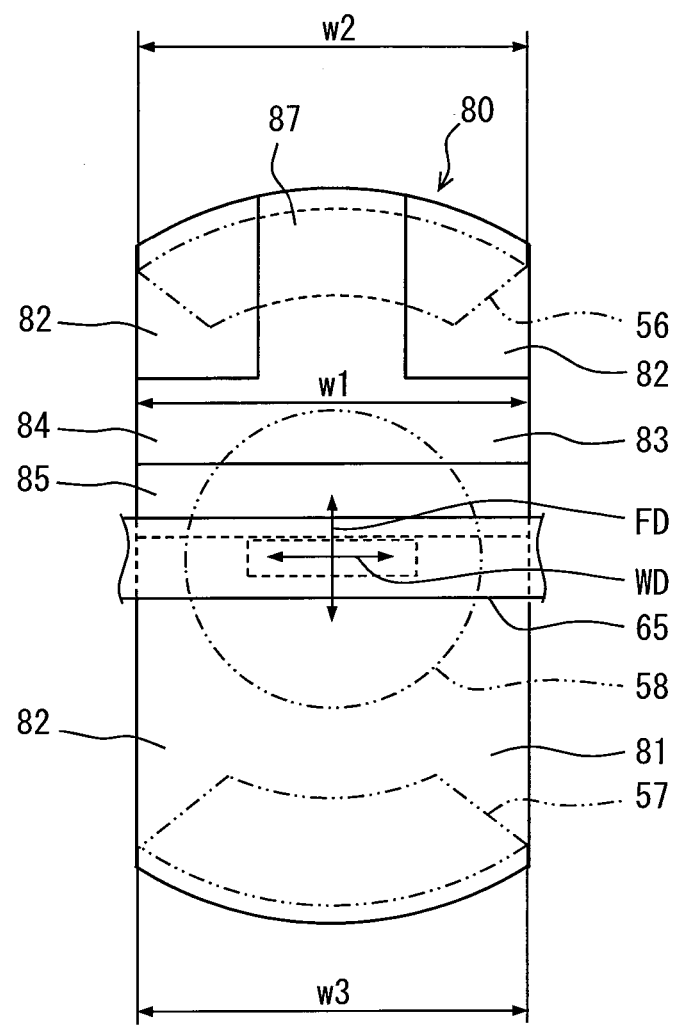
FIG. 4 is a plan view illustrating the holder cover of the first embodiment.

As illustrated in FIGS. 3 and 4, the auxiliary wall 87 is formed on an opposite side of the erected wall 83 from the projection region 57. The auxiliary wall 87 is erected outward in the axial direction AD from the exposed surface 82 to substantively the same level as the erected wall 83. The auxiliary wall 87 extends from a central part of the erected wall 83 in the width direction WD to an outer edge of the exposed surface 82 along the opposing direction FD. The auxiliary wall 87 has a shape that is continuous with the erected wall 83 and that extends in a direction perpendicular to the erected wall 83 so as to enhance strength of the erected wall 83 and the main body plate part 81.

Functions of the above-described holder cover 80 will be explained below.

A foreign substance having magnetic properties such as iron powder can be contained in the fuel in the fuel tank 90 illustrated in FIG. 1. This iron powder or the like can be attached on an outer surface of the magnet holder 50 by the magnetic force of each magnet 51. The erected wall 83 illustrated in FIG. 2 achieves a function of preventing the attachment of this iron powder or the like. To explain in detail, an outer surface of the erected wall 83 standing from the exposed surface 82, particularly, the top surface 84 is positioned away from the magnets 51. Accordingly, the magnetic force of the magnets 51 is not easily applied to the top surface 84. As a result, the area of the magnet holder 50 on which the iron powder is easily attached is limited to the exposed surfaces 82 on both sides of the erected wall 83 with the erected wall 83 therebetween, and the iron powder or the like is not easily attached on the outer surface of the erected wall 83.

In the first embodiment described above, there can be avoided a situation where the magnetic flux mf passing through the shaft part 32 (see FIG. 2) is weakened due to the formation of a magnetic circuit between the two projection regions 56, 57 by iron powder or the like. In this manner, the regular magnetic flux mf passing through the element part 71 is stabilized, so that the liquid-level detection device 100 can continue to output a highly accurate detection result from the Hall IC 70 for a long period of use.

The erected wall 83 of the first embodiment extends in the width direction WD to separate the two projection regions 56, 57 illustrated in FIG. 4. As a result of such a shape, a situation in which iron powder or the like attached continuously from one to the other of the two projection regions 56, 57 forms a magnetic circuit can reliably be prevented. Consequently, detection accuracy of the liquid-level detection device 100 continues to be maintained high.

Moreover, the width size w1 of the erected wall 83 is secured as large as the respective maximum width sizes w2, w3 of the projection regions 56, 57, so that attachment of iron powder or the like on the exposed surfaces 82 around the erected wall 83 can be avoided. Since it becomes much more difficult to form the magnetic circuit connecting the projection regions 56, 57 as described above, the effect of maintaining the detection accuracy of the liquid-level detection device 100 is produced with high reliability.

Furthermore, the erected wall 83 of the first embodiment is located between the two projection regions 56, 57 by its arrangement overlapping partly with the central region 58. In this manner, the erected wall 83 located at a position, whose distances from the two magnets 51 are generally the same, is positioned reliably away from both the magnets 51. Accordingly, the function of making difficult the attachment of iron powder or the like on the outer surface of the erected wall 83 can reliably be achieved. As a consequence, a situation where deterioration of the detection accuracy is caused due to the magnetic circuit formed by iron powder or the like can be avoided more reliably.

In the liquid-level detection device 100 in which the float arm 65 formed from a magnetic material crosses over the exposed surface 82, the float arm 65 can form the magnetic circuit connecting the two projection regions 56, 57 together with the iron powder or the like attached on the exposed surface 82. For this reason, the erected wall 83 of the first embodiment is provided to rise up to the level above the float arm 65. Accordingly, the formation of the magnetic circuit over the erected wall 83 in collaboration between the float arm 65 and the iron powder or the like is avoided. Thus, the liquid-level detection device 100 including the float arm 65 can also maintain high detection accuracy.

In the first embodiment, the housing 20 may correspond to a "fixation body", the shaft part 32 may correspond to a "supporting part", and the magnet holder 50 may correspond to a "rotatable body". In addition, the magnet 51 may correspond to a "magnet part", the Hall IC 70 may correspond to a "detecting part", and the fuel tank 90 may correspond to a "container".

Second Embodiment

Figure 5:
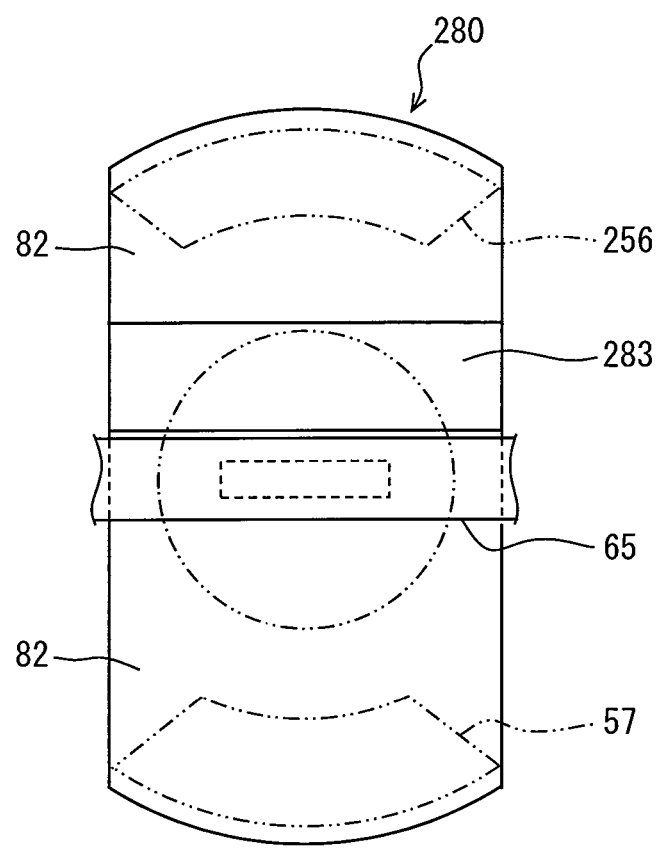
FIG. 5 is a diagram illustrating a modification to FIG. 4.

A second embodiment illustrated in FIG. 5 is a modification to the first embodiment. A holder cover 280 of the second embodiment does not include the configuration corresponding to the auxiliary wall 87 of the first embodiment (see FIG. 4). Accordingly, one projection region 256 is formed continuously without breaking at its middle portion similar to the other projection region 57. A side wall of an erected wall 283 adjacent to the float arm 65 is provided substantively perpendicular to an exposed surface 82. In this second embodiment as well, the formation of a magnetic circuit connecting the projection regions 256, 57 can be prevented by producing a similar effect to the first embodiment. As a result, a liquid-level detection device 100 can continue to output a highly accurate detection result for a long period of use.

The embodiments have been described above. The present disclosure is not interpreted by limiting to these embodiments, and can be applied to various embodiments and their combination without departing from the scope of the disclosure. Modifications to the above-described embodiments will be described below.

In the above embodiments, the erected wall 83, 283 is formed integrally with holder cover 80, 280. As a result of such a configuration, strength of the erected wall is easily ensured. However, the erected wall may be formed separately from the holder cover and configured to be attached to this cover. By such a configuration, the erected wall can be formed from a non-magnetic material through which the magnetic flux mf does not easily pass compared with the above-described resin material. Moreover, the holder cover including the exposed surface may be configured integrally with the main body part.

In the above embodiments, the erected wall 83, 283 has a shape extending in the width direction WD. However, the shape of the erected wall may be changed appropriately. For example, the extending direction of the erected wall may be a direction shifted from the width direction WD as long as it crosses the opposing direction FD. Moreover, the width size w1 of the erected wall (see FIG. 4) may be much larger than the respective maximum width sizes w2, w3 of the projection regions, or may be smaller than the respective maximum width sizes w2, w3 of the projection regions. Furthermore, more than one erected wall may be provided to stand up between the two projection regions. The position of the erected wall is not limited to a middle position of the two projection regions, and may be greatly deviated from the central region and closer to one projection region.

The liquid-level detection device of the above embodiments may be disposed in a fuel tank made of a steel plate. Iron powder or the like easily is mixed into the fuel tank made of a steel plate when the tank is used for a long period of time. For this reason, the liquid-level detection device with stabilized detection accuracy by preventing the attachment of iron powder or the like to the magnet holder is particularly suitable for the fuel tank made of a steel plate.

In the above embodiments, the float arm 65 crosses the central region 58 of the exposed surface 82. However, a mode for holding the float arm may be changed such that the float arm does not cross over the exposed surface. In such a mode, the formation of the magnetic circuit is prevented more easily.

In the above embodiments, "a pair of magnet parts" are formed by the two magnets 51. However, "a pair of magnet parts" are not limited to the above-described configuration as long as they can apply the magnetic flux to the Hall IC. For example, each of "a pair of magnet parts" may be formed by combination of more than one magnet. Alternatively, two magnetic poles with different polarities magnetized by one magnet may correspond to "a pair of magnet parts" respectively. Similarly, the specific configurations such as the "detecting part" and the "supporting part" may also be changed appropriately.

The explanation have been given above based on the examples of application to the liquid-level detection device 100 for a vehicle that detects a remaining amount of fuel. However, the object for application of the present disclosure does not need to be limited to such a liquid-level detection device, but may be a liquid-level detection device in a container for another liquid mounted on a vehicle, such as brake fluid, engine coolant, or engine oil. In addition, the present disclosure is applicable to a liquid-level detection device which is disposed in a liquid container provided for various domestic apparatuses or various transport machines, as well as to a liquid-level detection device for a vehicle.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid-level detection device for detecting a level of a liquid surface of liquid stored in a container, comprising:
   a rotatable body that rotates in accordance with the liquid surface;
   a fixation body that includes:
      a main body part fixed to the container; and
      a supporting part projecting from the main body part in an axial direction along a rotation axis of the rotatable body to rotatably support the rotatable body;
   a pair of magnet parts that are held by the rotatable body at arrangement positions with the rotation axis therebetween to generate a magnetic flux passing through the supporting part; and
   a detecting part that includes an element part disposed inside the supporting part to output a detection result according to a density of a magnetic flux passing through the element part, wherein:
   the rotatable body includes an exposed surface that is located outward of the supporting part and the pair of magnet parts in the axial direction and that is exposed into the container;
   an erected wall rising up from the exposed surface outward in the axial direction is provided between two projection regions which are obtained by projecting the pair of magnet parts onto the exposed surface outward in the axial direction;
   a direction in which the two projection regions are arranged side by side on the exposed surface is an opposing, direction;
   the erected wall extends in a direction crossing the opposing direction along the exposed surface; and
   a length of the erected wall in a width direction perpendicular to the opposing direction along the exposed surface is equal to or larger than respective maximum lengths of the projection regions in the width direction.

2. The liquid-level detection device according to claim 1, wherein at least a part of the erected wall is located in a central region obtained by projecting the supporting part onto the exposed surface outward in the axial direction.

3. The liquid-level detection device according to claim 1, further comprising:
   a float that floats on the liquid surface; and
   a float arm that is formed from a rod-shaped magnetic material, wherein:
   the float arm is held by the rotatable body and crosses over the exposed surface to hold the float; and
   the erected wall is provided to rise up to a level exceeding the float arm outward in the axial direction.

4. The liquid-level detection device according to claim 1, wherein
   the magnet parts are held to be separated from each other, and
   the erected wall extends in the direction crossing the opposing direction along the exposed surface in the two projection regions which are separated from each other.

* * * * *